United States Patent [19]

Hendy

[11] 4,165,956

[45] Aug. 28, 1979

[54] COATED TUBULAR FORMS

[75] Inventor: Brian N. Hendy, Welwyn, England

[73] Assignee: Imperial Chemical Industries Limited, London, England

[21] Appl. No.: 799,158

[22] Filed: May 23, 1977

[30] Foreign Application Priority Data

Jun. 1, 1976 [GB] United Kingdom ............... 22562/76

[51] Int. Cl.² .......................... B29C 25/00; B29D 7/20
[52] U.S. Cl. ..................................... 425/71; 118/257; 425/92; 425/106
[58] Field of Search ............... 118/257, 106, DIG. 11, 118/125; 425/71, 72 R, 90, 384, 92, 106

[56] References Cited

U.S. PATENT DOCUMENTS

| 1,796,691 | 3/1931 | Jansen . | |
| 1,871,917 | 8/1932 | Rocca | 118/106 |
| 2,022,009 | 11/1935 | Rocca | 118/106 |
| 3,036,931 | 5/1962 | Kell . | |
| 3,068,516 | 12/1962 | Hofer | 118/125 X |
| 3,363,530 | 1/1968 | Rice | 118/257 X |
| 3,389,009 | 6/1968 | McNulty et al. | 118/257 X |
| 3,819,776 | 6/1974 | Robinson et al. | 425/71 X |

FOREIGN PATENT DOCUMENTS

| 2540996 | 1/1977 | Fed. Rep. of Germany . |
| 348108 | 4/1931 | United Kingdom . |
| 416967 | 9/1934 | United Kingdom . |
| 852864 | 11/1960 | United Kingdom . |
| 1111371 | 4/1968 | United Kingdom . |
| 1205515 | 9/1970 | United Kingdom . |

Primary Examiner—John P. McIntosh
Attorney, Agent, or Firm—Cushman, Darby & Cushman

[57] ABSTRACT

An apparatus for coating an axially moving tubular form by depositing a coating medium on a surface of the form, and spreading the deposited medium around at least part of the surface in a direction transverse to the movement of the form. The technique is suitable for the deposition of a uniform coating of a flowable medium on a tubular film-forming substrate—particularly in the production of antistatic polyolefin films.

Figure 4:
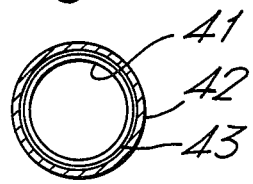

6 Claims, 6 Drawing Figures 4,165,956

COATED TUBULAR FORMS

This invention relates to tubular forms, and, in particular, to an apparatus for coating a surface of a tubular form.

Tubular forms, such as pipes and tubular film-forming extrudates, are coated for a variety of reasons, for example—to improve the gas-barrier characteristics of the form, or to confer heat-sealing properties on a relatively inert film surface. Such coatings are usually applied by depositing a coating material in flowable condition, for example—as a melt, or as a solution or dispersion of the coating material in a liquid vehicle, on to a surface of the tubular form, and spreading the deposited coating material over that surface by means of an appropriately positioned cooperating spreading member. The deposited coating may be spread directly on the surface of the tubular form by a stationary annular spreading member, suitably in the shape of a closely fitting, abrasive-filled, resilient collar encircling the form. Alternatively, the tubular form may first be collapsed to the lay-flat state, and the deposited coating spread by means of at least one flat member, such as a bar or roller, engaging each of the opposed surfaces of the collapsed tube. The hitherto practised techniques thus involve longitudinal axial movement of the tubular form relative to the spreading member, so that the deposited coating material is spread longitudinally on the form surface, and, in practice, have proved difficult to operate to yield consistently uniform, high quality coatings.

Accordingly, the present invention provides an apparatus for coating an axially moving tubular form comprising depositing a coating medium on a surface of the form, and spreading the deposited medium around at least part of the surface in a direction transverse to the direction of movement of the form.

The invention also provides an apparatus for coating an axially moving tubular form comprising means for depositing a coating medium on a surface of the form, and means, cooperable with the form surface in a direction transverse to the direction of movement of the form, to spread the deposited medium around at least part of the surface of the form.

Although tubular forms of various cross-sectional shapes may be coated, the technique of the present invention is particularly suitable for the coating of cylindrical tubular forms—for example, a cylindrical, tubular, thermoplastic, polymeric extrudate from which an oriented film can be produced on inflation and stretching by a conventional "bubble" film-forming process.

Reference in this specification to movement of the tubular form in an "axial" direction indicates movement substantially in the direction of the longitudinal axis of the form, and includes movement in a direction slightly inclined to said longitudinal axis, to accommodate the sway or wander normally experienced in conventional processes for the manufacture of tubular forms. Movement of the tubular form through the coating apparatus may be effected under the influence of gravity, or by conventional moving means, such as cooperating rollers, or endless belts, which engage the external surface of the tubular form to forward the latter in the desired direction.

Although, in general, coatings in flowable condition, for example—a molten polymeric material, are suitable for application by the technique of the present invention, we prefer, for convenience and ease of application, to employ coatings in the form of a solution or dispersion of the coating material in a liquid medium. An aqueous solution or dispersion of the coating material is particularly convenient in terms both of cost of the liquid medium, and of safety in avoiding the explosive and toxicity hazards attendant upon the use of volatile organic solvents.

The transverse spreading technique of the present invention ensures that the applied coating medium is positively spread and smoothed onto the form surface by the polishing action created by the tangential wiping motion of the spreading member relative to the moving form surface. This assists the formation of a uniform coating, and avoids "flooding" of the coating medium at regions of the form exhibiting surface indentations and irregularities.

To improve the spreadability of the coating medium and ensure that it remains uniformly dispersed after spreading on the form surface, properties such as the viscosity and surface tension of the coating medium can be adjusted to a suitable value—for example by inclusion in the coating medium of a conventional viscosity modifier, such as a water-soluble polymer, and/or an appropriate surfactant. The appropriate balance of these characteristics depends, inter alia, on the temperature of the coating environment and the rate at which the applied coating is allowed to dry, and is readily established by simple experimentation. Thus, a relatively viscous coating medium, for example—a medium having a viscosity (measured with a Brookfield Viscometer, spindle No 6) of the order of 22,500 centipoise (10 rpm) or 5,350 centipoise (100 rpm), can be employed.

The technique of the present invention may be employed in the application of coatings of various kinds, but has proved particularly useful in the production of thermoplastic polymeric films having an antistatic coating on a surface thereof. For example, a coating medium comprising an aqueous solution of a quaternary ammonium compound, such as choline chloride, as antistatic agent may be employed. An amine sulphate prepared from 'Ethomeen' T12 (supplied by Armour Hess Chemicals Limited) has also proved of value as an independent antistatic agent, and additionally exhibits surfactant characteristics. Accordingly a combination of choline chloride and 'Ethomeen' T12 sulphate in aqueous solution has proved to be a particularly effective antistatic coating medium for use according to the present invention. Other antistatic agents, alone or in combination, may be employed, if desired.

The amount of amine sulphate present as the sole antistatic agent in the solution or dispersion applied to the tubular form depends, inter alia, on the level of antistatic properties required in the treated product, and can be readily determined by simple experimentation. Relatively high concentrations of amine sulphate are suitable, provided that the viscosity of the solution or dispersion is not increased to a level which adversely affects the mobility and spreadability thereof, and are advantageous in that the amount of volatile vehicle, which may adversely affect the form surface during evaporation therefrom, is kept to a minimum. In practice, the amine sulphate is conveniently employed at a concentration of up to about 60% by weight of the solution or dispersion, and is suitably employed at concentrations within a range of from 5 to 55%, preferably from 10 to 50%, by weight of the solution or dispersion. However, if the antistatic influence of the amine sulphate is supplemented by the presence of an additional additive, such as choline chloride, the concentration of the amine sulphate may be reduced to a relatively low value, for example of the order of 0.25 to 2.5%, the total concentration of the amine sulphate and the additional additive being within the aforementioned range of up to 60% by weight of the solution or dispersion. Suitably, the concentration of the amine sulphate, alone or together with a supplementary additive, is selected so as to yield a product, such as a polyolefin film derived from the coated form, exhibiting a surface resistivity, measured at 50% Relative Humidity, not exceeding 10 gigohms, and preferably less than 5.0 gigohms.

In practice, we have observed that adequate surfactant behaviour is achieved by the use of a relatively small amount of a long chain amine sulphate. Such salts are less effective, weight for weight, as antistatic agents than short chain quaternary ammonium compounds, such as choline chloride, and we therefore prefer to employ a solution or dispersion comprising a major proportion of the quaternary ammonium compound and a minor proportion of the amine sulphate. Conveniently, the weight ratio of quaternary ammonium compound to amine sulphate in the solution or dispersion applied to the tubular form is from 2:1 to 50:1, preferably between 15:1 and 30:1. As hereinbefore described, the combined concentration of quaternary ammonium compound and amine sulphate is desirably such, for example up to about 60% by weight of the applied solution or dispersion, that the viscosity of the solution or dispersion is not increased beyond a level at which a uniform distribution of the additives on the substrate can be achieved.

The amount of coating medium employed will depend, inter alia, on the application envisaged for the coated tubular form, and on the required characteristics of the coated surface—such as coefficient of friction and/or electrical conductivity, but, in the case of an oriented polyolefin film substrate the coating medium is conveniently applied in an amount which will yield an average dry coat thickness within a range of from 0.0005 to 0.03 $\mu$m, preferably from 0.001 to 0.002 $\mu$m.

Deposition of the coating medium onto a surface of the tubular form is effected in any convenient manner—for example, by spraying, brushing, by discharge from a suitably positioned manifold, or by pumping in the form of an aerated foam. However, to avoid profile defects, we prefer that the coating medium be deposited on the spreading member, and thence transferred, by direct contact, to the form surface.

The means for spreading the deposited coating medium should be such as will smear and spread the coating medium around the tube surface in a direction transverse to the direction of movement of the form. For example, if the coating medium is to be spread on the inside surface of the tube the spreading member may be a disc or mop capable of rotation about the longitudinal axis of the tubular form, and in engagement with the internal surface thereof. In general, however, to facilitate application of the coating medium we prefer to coat the external surface of the tubular form, in which case the spreading member is conveniently an endless belt driven in engagement with the external surface of the tubular form. The belt may encircle the tubular form in such a manner as to spread the deposited coating medium by contact with either the internal or the external surface of the belt. It will be appreciated that a belt assembly of this kind can engage only part of the form surface, and to provide a continuous coating over the entire peripheral surface of the form two or more driven-belt spreaders will be required, the belts being spaced apart along the longitudinal axis of the form, and suitably disposed around the periphery of the form.

In effect, the spreading belt is driven in a plane substantially normal to the longitudinal axis of the moving form, but movement of the latter tends to drag the belt in the direction of movement of the form. As the linear speed of the driven belt is increased, the displacement of the belt by the tubular form becomes progressively less significant, and, desirably, the speed of the belt should be adjusted relative to that of the form to ensure that, as nearly as possible, movement of the belt occurs in a plane normal to the direction of movement of the form. Factors influencing the degree of displacement of the belt include the location of the belt driving means relative to the tubular form, and the nature of the coating medium which, to some extent, acts as a lubricant.

The belt is suitably of a resilient, rubbery material capable of conforming to the surface profile of the tubular form, and is conveniently provided with a ribbed or toothed surface for engagement with an appropriately profiled drive pulley. The opposite surface of the belt, i.e. the contact surface, which engages a surface of the tubular form, is suitably provided with a contact layer of a material capable of spreading and polishing the deposited coating medium to an acceptably uniform finish. The contact material is desirably soft, and inert to the coating medium, and should be selected so as to exhibit an acceptable life span despite the conditions encountered during the coating operation; e.g. the belt may have to operate in a relatively high temperature environment, and is subjected to a constant abrading action against the surface of the tubular form. Lint, or a resilient foam, such as a polyurethane foam, may be employed as the contact layer. Preferably however the contact layer should be of a material which does not absorb the coating medium and therefore retains its resilience and consistency when wetted by the coating medium; neither should it have a porous structure such that the coating medium will dry out to form a hard crust within the pores of the contact layer. Expanded elastomers having closed cell structures overcome this difficulty. A particularly suitable contact layer comprises a neoprene foam backing layer having adhesively bonded thereto, for engagement with the tubular form, a layer of a nylon fabric.

As an alternative to a plurality of spaced-apart belts, an annular sleeve or collar, encircling, and rotatable in contact with, the moving form, may be employed to spread the coating medium around the external surface of the form in a single spreading operation. If desired, an appropriate contact layer may be provided on the inner surface of the sleeve or collar and resiliently biased to accommodate variations in the curvature of the tubular form.

If desired, both surfaces, internal and external, of a tubular form may be coated by a combination of the hereinbefore described techniques.

To achieve adequate spreading of the applied coating medium there should be relative transverse movement between the spreading member and axially moving tubular form. In practice, this is conveniently achieved by ensuring that the tubular form is non-rotatable about its longitudinal axis, in the direction of movement of the spreading member, to any significant extent during the spreading operation.

After application, and spreading, the applied coating medium may be formed into a continuous dry, adherent, coating layer on the tubular form by conventional procedures—for example, by allowing the coating to dry at ambient temperature, or by passing the coated form through a drying oven to evaporate the solvent or dispersant medium.

The present invention is particularly suited to the production of self-supporting coated films formed from a thermoplastic film-forming polymeric material.

By a "self-supporting" film is meant a film capable of independent existence in the absence of a supporting substrate, a polyolefin packaging film being a typical example thereof. Suitable thermoplastic film-forming polymeric materials include polycarbonates, polysulphones, polyamides such as polyhexamethylene adipamide or polycaprolactam, polyesters such as polyethylene terephthalate and polyethylene-1, 2-diphenoxyethane-4, 4'-dicarboxylate, vinyl polymers and copolymers, and polymers and copolymers of 1-olefins such as ethylene, propylene, butene-1, 4-methylpentene-1. A preferred material is a high molecular weight stereoregular predominantly crystalline polymer of propylene, either in the form of a homopolymer or copolymerised with minor quantities (e.g. up to 15% by weight of the copolymer) of other unsaturated monomers, such as ethylene.

An oriented tubular film is suitably produced by melt extruding the desired polymeric material in tubular form from a simple annular die, cooling the extruded tube, reheating and inflating the tube by the so-called "bubble" process to introduce transverse orientation, and simultaneously elongating the tube longitudinally to orient the film in a lengthwise direction. The film is then preferably "heat-set", i.e. dimensional stability of the film is improved by heating the film, while restrained against thermal shrinkage, to a temperature above the glass transition temperature of the polymer from which the film is formed but below the melting point thereof.

A similar technique employing a multi-channel, annular, coextrusion die is suitable for the production of multiple-layer films, such as a polypropylene substrate having on at least one surface thereof a layer of a copolymer of propylene (80 to 95% by weight) with another alpha-olefin containing from 4 to 10 carbon atoms, such as butene-1.

In the production of a coated film according to the invention, the coating medium is conveniently deposited and spread on a surface of the cast, unoriented tubular extrudate immediately prior to the reheating and orienting stage of the film-forming process. Drying of the coating, for example—by evaporation of the volatile solvent or dispersant, is therefore effected during the reheating operation, and the dried coating layer becomes firmly bound to the film surface during orientation.

Coated films made according to the present invention may contain any of the additives conventionally employed in the production of thermoplastic films, and may be subjected to conventional after-treatments—for example, exposure to a corona discharge treatment to improve the bonding and print-receptive characteristics of the film surface.

Films made according to the present invention may vary in thickness depending on the intended application, but usually we find that films having a thickness of from 2 to 150 microns are of general utility. Films intended for use in packaging operations are suitably within a thickness range from 10 to 50 microns.

Figure 1:
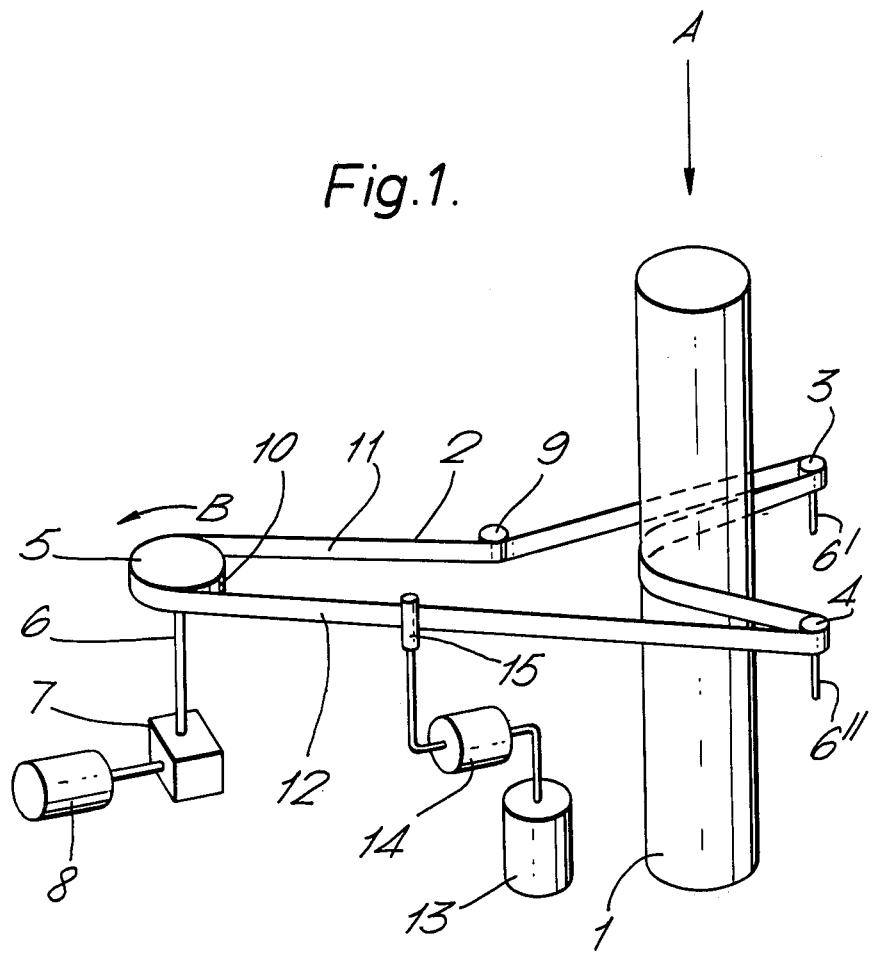
Figure 2:
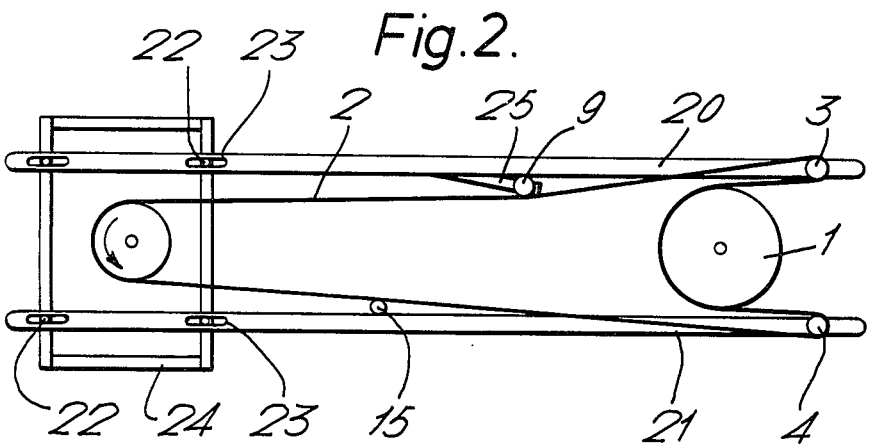

The invention is illustrated by reference to the accompanying drawings in which:

FIG. 1 is a schematic perspective view of an axially moving tube having a coating medium applied thereto by a transversely moving belt, FIG. 2 is a schematic plan view of the assembly of FIG. 1, providing details of a mounting system for the belt assembly.

Figure 3:
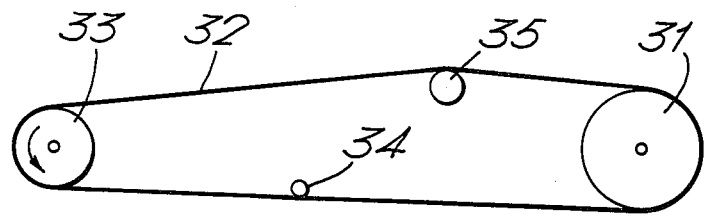
Figure 5:
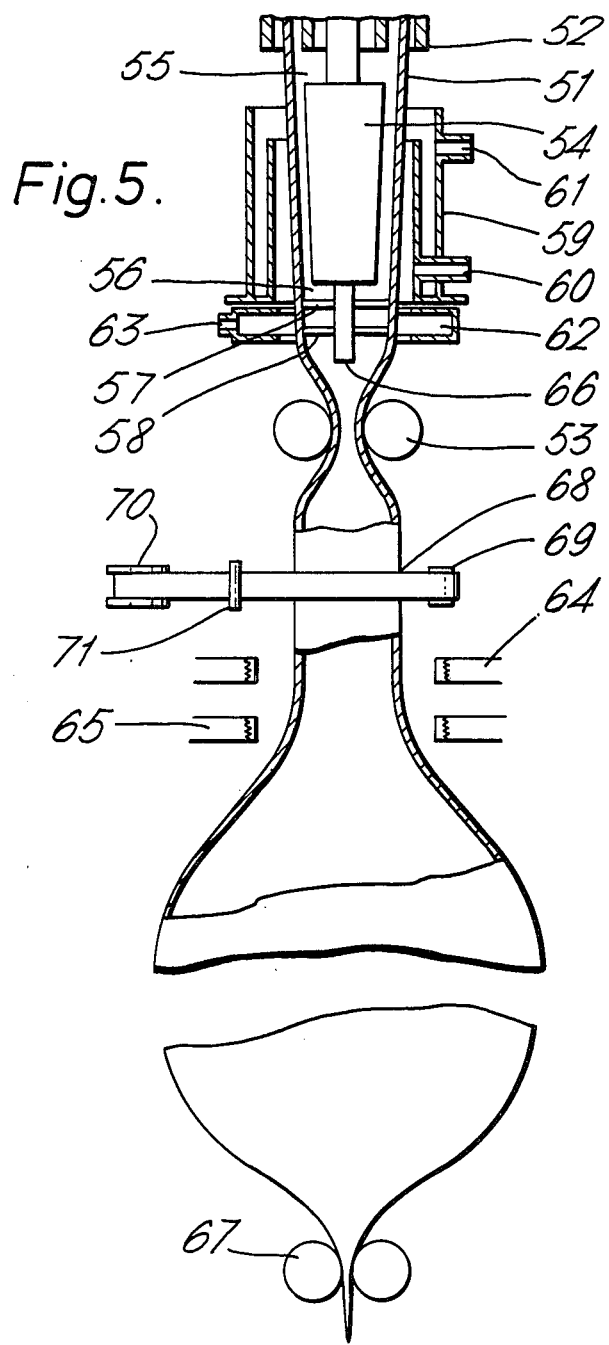

FIG. 3 is a simplified plan view of an alternative arrangement whereby the coating medium is applied to the tube from the internal surface of the belt, FIG. 4 is a simplified plan view of an assembly for coating the entire peripheral surface of the tube in a single operation, and FIG. 5 is a schematic elevation depicting the application of a coating medium to a quenched tubular extrudate during the production of an oriented polymeric film.

Figure 6:
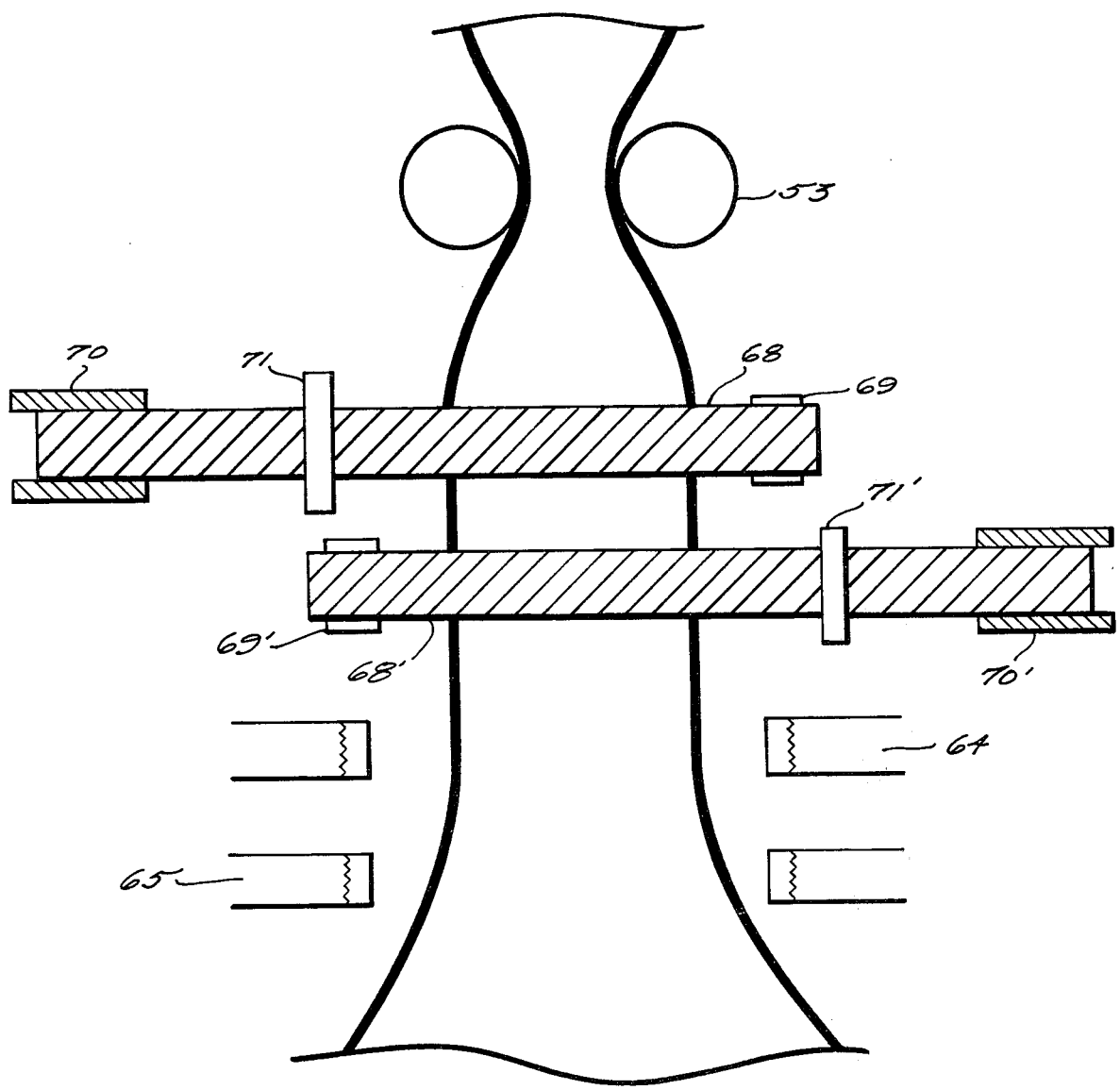

FIG. 6 is a schematic elevation like that of FIG. 5 only showing a plurality of belts associated with the tubular extrudate.

Referring to FIG. 1, a tubular form 1 travelling in the longitudinal axial direction indicated by arrow A, is partially encircled by a cooperating endless belt 2 supported on guide pulleys 3, 4 and driven, in the direction of arrow B in a plane substantially normal to axis A, by a drive pulley 5 secured to drive shaft 6 which is coupled through gear box 7 to an electric motor 8. In a preferred embodiment, pulley 5 may be allowed to idle, either or both of pulleys 3 and 4 being driven by a similar geared drive assembly (not shown) through the associated drive shaft 6', 6". A significant improvement in coating is, in fact, observed when leading pulley 4 is employed as the sole driving source for the belt. Maintenance of an appropriate tension in belt 2 is achieved by means of a springloaded or weighted pulley 9 bearing against the external surface of the belt.

The driving face of pulley 5 is provided with teeth 10 for engagement with mating teeth 11 on the innermost surface of belt 2 to prevent slippage of the latter during the coating operation.

A contact layer 12 is a soft material, such as a layer of polyurethane foam, or a neoprene rubber foam surfaced with a layer of nylon cloth, is provided on the external surface of belt 2 to receive a liquid coating medium transferred from reservoir 13 by a micropump 14 and delivered to the belt through a dispensing head 15 in the form of a vertically positioned tube provided with a perforated wall engaging the contact layer 12. Coating medium dispensed from head 15 is supported on contact layer 12, and carried on belt 2 around pulley 4 into engagement with the external surface of tube 1, where the coating medium is deposited and then smoothed onto the tube surface by the polishing action between the relatively transversely moving tube and belt.

The applied coating may then be dried in a suitable oven, if desired.

As depicted in FIG. 2, a mounting assembly for the belt system includes a pair of elongate members 20, 21 respectively supporting rotatable guide pulleys 3, 4, each of these members being adjustably secured, by bolts 22 engaging in slots 23, to a rigid framework 24 within which are supported drive pulley 5 and its associated drive and transmission system (not shown). Tension control pulley 9 is rotatably mounted on a springloaded bias member 25 pivotally attached to elongate member 20 so that as the mounting assembly is presented to axially moving tube 1, by movement of the assembly from left to right as depicted in the drawing, the portion of belt 2 between pulleys 3 and 4 is displaced to the left by engagement with the tube surface, and bias member 25 is displaced outwardly by contact between pulley 9 and belt 2 to maintain an appropriate tension in the latter. Dispensing head 15 for the coating medium is conveniently secured to support member 21.

In the alternative arrangement of FIG. 3, an axially moving tube 31 passes within, and in contact with, a belt 32, driven by drive pulley 33, the inner contact surface of the belt being supplied with coating medium from dispensing head 34, and being maintained under tension by control pulley 35.

In the system of FIG. 4, a liquid coating medium is deposited on the outer surface of an axially moving tube 41 from an annular manifold (not shown) upstream of an annular rotatable sleeve 42. On rotation of sleeve 42 about the tube, by engagement with a suitable drive mechanism (not shown), the deposited coating medium is spread and polished onto the tube surface by means of soft contact layer 43 on the inner surface of sleeve 42.

Referring to FIG. 5, which depicts a film-forming apparatus employing a lubricated mandrel of the kind particularly suitable for the production of polyolefin films a tube of thermoplastic material 51 is shown being extruded from an annular extrusion die 52. The tube is withdrawn from the extrusion die by a pair of contra-rotating nip rolls 53 which are of width less than the collapsed tube. The rolls 53 withdraw the tube at a rate greater than that at which it is extruded, thus hauling the tube down on to a cooling mandrel 54 situated inside the tube, and forwarding the cooled tube for further treatment. Water is supplied to between the tube and the mandrel by maintaining a small head of water in the space 55 at the top of the mandrel. Water is therefore carried down between the mandrel 54 and the tube 51 into the space 56 formed between the bottom of the mandrel and a resilient sealing member 57. Water is removed from this space through a pipe (not shown) which passes through the centre of the mandrel.

Below sealing member 57 is positioned a circular sponge 58 which contacts the inside of the tube 51 to remove any moisture which passes the seal. This moisture is removed from the sponge 58 by applying vacuum through a suction pipe (not shown).

In practice an intermediate sealing member is usually positioned between sealing member 57 and sponge 58 together with means to pressurise the tube in this region, and to control the extent to which water from space 56 penetrates between the mandrel and the tube, but these details are omitted for clarity.

As well as being cooled internally, the tube 51 is cooled externally by passage through a water bath 59 which surrounds the tube. Water is continually introduced into the water bath through pipe 60 and flows out through pipe 61. After passing through the water bath, the tube passes through a chamber 62 where vacuum is applied to the outside of the tube through pipe 63 to remove any water from the outside of the tube.

The cooled tube then passes through the pair of nip rolls 53 which control the speed at which the tube is travelling, and through banks of infra-red heaters 64 and 65 which raise the temperature of the tube to that required for stretching. The tube is then stretched in the direction transverse to its direction of extrusion by air under pressure introduced through pipe 66 to inflate the tube, and is simultaneously stretched longitudinally by a pair of nip rolls 67 which collapse, and form an air-tight seal across, the inflated tube, and withdraw the collapsed tube at a rate greater than that at which the extruded tube is withdrawn from the extrusion die by the nip rolls 53.

Coating of the extruded tube is effected by a coating assembly of the kind illustrated in FIG. 1, located between nip rolls 53 and infra-red heater 64. Thus, an applicator belt 68, supported on a pulley assembly 69, and driven by drive pulley 70 around and in contact with part of the external surface of cooled tube 51, is supplied with liquid coating medium from dispensing head 71. The coating medium is transferred from the belt to, and polished around, part of the tube surface, as described in relation to FIG. 1. Coating of the entire surface of tube 51 may be achieved by employing a second belt assembly, such as shown at 68', 69', 70', and 71' in FIG. 6, appropriately positioned relative to the tube downstream of belt 68.

The applied, polished, coating is then dried by passage of the coated tube, through infra-red heaters 64 and 65.

The invention is further illustrated by reference to the following Examples.

EXAMPLE 1

Using a tubular film-forming apparatus of the kind depicted in FIG. 5 a composite triple-layer tube, having a polypropylene core with a layer of a propylene-butene-1 copolymer on each surface thereof, was extruded downwardly at a rate of 102 mm/s (20 feet/minute), and cooled by means of the internal quenching mandrel 54 and external water bath 59. The resulting cast tube, having a diameter of about 152 mm (6 inches) and wall thickness of about 0.94 mm (0.037 inch), was forwarded by nip rolls 53 through infra-red heaters 64, 65, and inflated to form a bubble, the peripheral speed of draw rolls 67 being controlled to yield a biaxially oriented tubular film exhibiting a draw ratio of about 7:1 in each of the longitudinal and transverse directions, and having a thickness of about 20 $\mu$m. The tubular film was then split to form a flat film which was heat-set on a system of matt-surfaced, hot rollers of the kind described in British Pat. No. 1,124,886.

Using a moving belt applicator of the kind shown in FIG. 1, and located between nip rolls 53 and the infra-red heater bank 64, 65 as shown in FIG. 5, an aqueous solution containing 50% by weight of 'Ethomeen' T12 sulphate was applied to, and polished on, the surface of the cast tube. The 'Ethomeen' T12 sulphate solution, prepared by reacting an aqueous solution of 'Ethomeen' T12 (Armour Hess Chemicalt Limited) with concentrated sulphuric acid, had a viscosity, measured with a Brookfield Viscometer—spindle No. 6, at various spindle speeds, as follows:

| Spindle Speed (rpm) | Viscosity (centipoise) |
| --- | --- |
| 10 | 22,500 |
| 20 | 17,250 |
| 50 | 8,900 |
| 100 | 5,350 |

This viscous solution was pumped through the perforated dispensing head 71 (FIG. 5) onto the felt contact surface of applicator belt 68, driven in contact with approximately half of the peripheral tube surface in a substantially horizontal plane at a linear speed of about 1.25 m/s, at a rate sufficient to yield a dry coat of average thickness of about 0.02 μm on the coated oriented film.

After slitting and heat-setting, a film of width approximately 1670 mm was derived from that portion of the cast tube to which the viscous antistatic coating solution had been applied. The surface conductivity of the film was measured at twenty-three positions uniformly spaced across the width of the film by means of a simple apparatus comprising a DC power supply (32 v battery) in series with a Sinclair Multimeter DM2, having a rated input impedance of 10 megohms, and with a grid electrode assembly—each of the two electrodes comprising seven parallel copper wire strips of 150 mm length secured at one end to a common conductor bar, the strips of each electrode being interleaved with those of the other and cemented to the surface of a rectangular glass plate. To measure surface conductivity of the film, the electrode assembly was placed on the film at the desired position under a loading of 5 kg, that portion of the film in contact with the electrodes thereby completing an electrical circuit through the apparatus. The voltage displayed on the Multimeter provided an arbitrary measure of the resistance of the film in the area under test, and, by virtue of the antistatic nature of applied coating medium, thereby provided an indication of the effectiveness of the applied coating in the area under test.

The voltage measured at each of the twenty-three positions is recorded in the following Table.

Table

| Position | Voltage |
| --- | --- |
| 1 | 0.05 |
| 2 | 0.78 |
| 3 | 4.33 |
| 4 | 1.62 |
| 5 | 5.12 |
| 6 | 4.35 |
| 7 | 3.98 |
| 8 | 2.79 |
| 9 | 3.25 |
| 10 | 3.19 |
| 11 | 1.84 |
| 12 | 1.14 |
| 13 | 0.75 |
| 14 | 2.42 |
| 15 | 2.90 |
| 16 | 1.34 |
| 17 | 1.02 |
| 18 | 1.74 |
| 19 | 1.22 |
| 20 | 0.80 |
| 21 | 0.81 |
| 22 | 1.21 |
| 23 | 1.44 |

The average value of the recorded voltages is 2.09, and it is observed that, apart from a significant divergence from this value between positions 3 and 10, the effectiveness of the coating, as measured by voltage, is surprisingly uniform over the remainder of the width of the film.

EXAMPLE 2

The procedure of Example 1 was repeated except that the linear speed of the applicator belt was reduced to 0.83 m/s (from 1.25 m/s).

The voltage measured at each of twenty-three positions regularly spaced across the film is recorded in the following Table.

Table

| Position | Voltage |
| --- | --- |
| 1 | 0.03 |
| 2 | 1.29 |
| 3 | 3.07 |
| 4 | 2.23 |
| 5 | 3.63 |
| 6 | 2.20 |
| 7 | 2.15 |
| 8 | 1.71 |
| 9 | 2.35 |
| 10 | 1.56 |
| 11 | 1.07 |
| 12 | 0.87 |
| 13 | 1.28 |
| 14 | 1.22 |
| 15 | 1.71 |
| 16 | 1.57 |
| 17 | 2.01 |
| 18 | 1.46 |
| 19 | 1.39 |
| 20 | 1.52 |
| 21 | 1.43 |
| 22 | 1.50 |
| 23 | 2.37 |

The average value of the recorded voltages is 1.72, and it is observed that the reduction in speed of the applicator belt has resulted in a coating of significantly improved uniformity.

EXAMPLE 3

The procedure of Example 1 was repeated except that:

(a) the applicator belt consisted of a neoprene foam backing layer with a nylon cloth contact layer adhered to a surface thereof, (b) the linear speed of the belt was reduced to 0.66 m/s, (c) the viscous coating solution was pumped to the perforated dispensing head at a rate of about 0.066 g/s, (d) the coating solution was a mixture of equal volumes of an aqueous solution containing 50% by weight of choline chloride and of an aqueous solution containing 14% by weight of 'Ethomeen' T12 sulphate, (e) the viscosity of the coating solution, measured as hereinbefore described, was

| Spindle Speed (rpm) | Viscosity (centipoise) |
| --- | --- |
| 10 | 4,000 |
| 20 | 3,800 |
| 50 | 3,540 |
| 100 | 2,850 |

(f) the coated film was not heat-set.

Voltage measurements made, as hereinbefore described, across the widths of two film strips selected at random from longitudinally spaced-apart regions of the resultant film are recorded in the following Table.

Table

| Position | Voltage | |
| --- | --- | --- |
| | Sample A | Sample B |
| 1 | 0.05 | 0.00 |
| 2 | 0.03 | 0.01 |
| 3 | 18.6 | 21.1 |
| 4 | 31.0 | 31.4 |
| 5 | 31.6 | 31.8 |
| 6 | 31.4 | 31.6 |
| 7 | 30.9 | 31.6 |
| 8 | 31.0 | 31.6 |

Table-continued

| Position | Voltage | |
|---|---|---|
| | Sample A | Sample B |
| 9 | 30.9 | 31.0 |
| 10 | 31.0 | 31.0 |
| 11 | 31.3 | 31.6 |
| 12 | 30.4 | 30.6 |
| 13 | 31.2 | 31.4 |
| 14 | 31.1 | 31.2 |
| 15 | 30.6 | 29.3 |
| 16 | 27.3 | 27.1 |
| 17 | 24.4 | 25.2 |
| 18 | 28.7 | 25.0 |
| 19 | 23.8 | 24.7 |
| 20 | 6.9 | 5.1 |
| 21 | 26.5 | 20.4 |
| 22 | 31.1 | 31.8 |
| 23 | 0.88 | 27.7 |
| Average | 24.37 | 25.31 |

Apart from the uniformity of the coating across the width of the film, and the reproducibility of the coating technique along the length of the film, these results demonstrate the remarkable increase in surface conductivity achieved by the inclusion of choline chloride in the coating medium.

EXAMPLE 4

The procedure of Example 3 was repeated except that the coating solution was pumped to the perforated dispensing head at a rate of about 0.033 g/s.

Voltage measurements across the width of two longitudinally spaced-apart samples from the resultant film are recorded in the following Table.

Table

| Position | Voltage | |
|---|---|---|
| | Sample A | Sample B |
| 1 | 0.00 | 0.00 |
| 2 | 0.01 | 0.01 |
| 3 | 0.08 | 1.86 |
| 4 | 9.2 | 26.6 |
| 5 | 26.5 | 28.8 |
| 6 | 29.4 | 31.1 |
| 7 | 30.3 | 30.7 |
| 8 | 30.3 | 30.1 |
| 9 | 31.2 | 31.6 |
| 10 | 30.8 | 30.6 |
| 11 | 29.9 | 30.7 |
| 12 | 29.8 | 29.2 |
| 13 | 27.2 | 24.8 |
| 14 | 26.4 | 27.3 |
| 15 | 21.3 | 21.3 |
| 16 | 21.7 | 5.5 |
| 17 | 4.13 | 0.23 |
| 18 | 0.23 | 0.01 |
| 19 | 0.13 | 0.00 |
| 20 | 0.01 | 0.05 |
| 21 | 0.78 | 6.10 |
| 22 | 1.83 | 0.00 |
| 23 | 0.01 | 0.00 |
| Average | 13.95 | 15.50 |

These results again demonstrate the conformity and reproducibility of the applied coating, although the conductivity of the coated film surface has been reduced, as expected, by the reduction in the rate of supply of the coating medium in comparison to Example 3.

EXAMPLE 5

Using a tubular film-forming apparatus generally of the kind depicted in FIG. 5 a composite triple-layer tube, having a polypropylene core with a layer of a propylene-butene-1 copolymer on each surface thereof, was extruded downwardly at a rate of 280 kg/hour, the tube travelling at a speed of 11.84 meters/minute, and was cooled, oriented, slit, and heat-set, as described in Example 1, to yield a film having a thickness of about 20 μm.

An annular collar, similar to that depicted in FIG. 4, having 6 contact pads (6 mm thick) of an expanded neoprene backing layer with a nylon cloth contact layer engaging the tube surface replaced the moving belt applicator between nip rolls 53 and the infra-red heater bank 64, 65 of FIG. 5. An aqueous solution comprising 6.0 wt % choline chloride, 0.4 wt % 'Ethomeen' T12 sulphate, and 93.6 wt % water, was fed via two brushes onto the cast tube upstream of the collar at a rate of 2.1 ml/minute, and spread around the tube surface by means of the collar which was rotated at a speed of 75 rpm. The applied solution had a surface tension of 33.2 dynes/cm at 20° C. and 27 dynes/cm at 95° C., and a contact angle on the cast tube substrate extending from 47° at 20° C. to less than 5° at 80° C.

After orienting, slitting and heat-setting, two films, each of width approximately 1670 mm, were derived from the coated tube. The surface conductivity of each film was measured at twelve positions uniformly spaced across the width of the film by means of a simple apparatus comprising a DC power supply of 70 volts in series with an electronic microammeter and with an electrode assembly comprising a pair of knife edged electrodes each of 100 mm length and spaced apart in parallel by a distance of 0.25 mm. To measure surface conductivity of the film, the electrode assembly was placed on the film at the desired position thereby completing an electrical circuit through the apparatus. The conductivities recorded by the microammeter provided an indication of the effectiveness of the applied coating in the area under test.

The surface conductivities (in units of $10^{-12}$ mhos per square) recorded at 29% Relative Humidity at each of the twelve positions on each film sample are recorded in the following Table.

Table

| Position | Surface Conductivity | |
|---|---|---|
| | Sample A | Sample B |
| 1 | 30 | 30 |
| 2 | 52 | 44 |
| 3 | 34 | 60 |
| 4 | 36 | 46 |
| 5 | 58 | 52 |
| 6 | 62 | 60 |
| 7 | 100 | 60 |
| 8 | 120 | 98 |
| 9 | 60 | 82 |
| 10 | 98 | 42 |
| 11 | 60 | 70 |
| 12 | 50 | 70 |
| Average | 63 | 59 |

These results again demonstrate the uniformity and reproducibility of the coating on the film which was of perfect optical appearance and exhibited desirable heat-sealing characteristics.

I claim:

1. An apparatus for the production of an oriented tubular film comprising
   an annular die for the extrusion of a tube of thermoplastic material,
   means for cooling the extruded tube,
   means for withdrawing and axially forwarding said cooled tube, means for reheating and inflating the withdrawn tube to form an oriented tubular film, and means for coating the tube of thermoplastic material by spreading coating material thereon without distortion and twisting of the tube, said coating means positioned between said forwarding means and said reheating means and comprising a dispensing head for supplying a liquid coating medium to the external surface of the cooled tube, a belt having a resilient contact layer cooperable with the tube external surface, and means for driving said belt in a plane substantially normal to the longitudinal axis of said tube to spread the supplied coating medium around at least part of said tube external surface.

2. An apparatus according to claim 1 wherein said coating means comprises a plurality of endless belts axially spaced apart and circumferentially disposed relative to each other about said tube, and means for driving each of said belts in a plane substantially normal to the longitudinal axis of said tube, so that together said belts spread the supplied coating medium around the entire external peripheral surface of the tube.

3. An apparatus according to claim 1 wherein said coating means includes a bias member cooperable with said belt to control the tension therein.

4. An apparatus according to claim 1 wherein said dispensing head is arranged to deliver coating medium to said belt for transfer to the external surface of the tube.

5. An apparatus according to claim 1 wherein said driving means includes a leading pulley engaging a surface of said belt.

6. An apparatus according to claim 1 wherein said belt resilient contact layer is of an expanded elastomer with a closed cell structure.

* * * * *